United States Patent
Piou (10) Patent No.: US 10,343,458 B2
(45) Date of Patent: Jul. 9, 2019

(54) AGRICULTURAL WHEEL

(71) Applicant: Otico, Chalmaison (FR)

(72) Inventor: Denis Piou, Villeblevin (FR)

(73) Assignee: OTICO, Chalmaison (FR)

( * ) Notice: Subject to any disclaimer, the term of this patent is extended or adjusted under 35 U.S.C. 154(b) by 0 days.

(21) Appl. No.: 14/935,995

(22) Filed: Nov. 9, 2015

(65) Prior Publication Data

US 2016/0129729 A1 May 12, 2016

(30) Foreign Application Priority Data

Nov. 10, 2014 (FR) ..................... 14 60860

(51) Int. Cl.

| | |
|---|---|
| *B60C 7/24* | (2006.01) |
| *B60C 7/10* | (2006.01) |
| *B60B 3/08* | (2006.01) |
| *B60C 15/028* | (2006.01) |
| *B60C 15/02* | (2006.01) |
| *A01C 5/06* | (2006.01) |
| *A01B 29/04* | (2006.01) |

(52) U.S. Cl.
CPC ............... *B60C 7/24* (2013.01); *A01B 29/043* (2013.01); *A01C 5/068* (2013.01); *B60B 3/085* (2013.01); *B60C 7/102* (2013.01); *B60C 15/022* (2013.01); *B60C 15/028* (2013.01)

(58) Field of Classification Search
CPC ....... B60C 19/04; B60C 17/009; B60C 17/04; B60C 17/041; B60C 17/042; B60C 17/043; B60C 15/022; B60C 15/028; B60C 7/102; B60C 7/24; A01B 29/043; A01C 5/068; B60B 3/08; B60B 3/085
See application file for complete search history.

(56) References Cited

U.S. PATENT DOCUMENTS

2016/0114623 A1 * 4/2016 Smith ................ B60C 15/0213
301/11.1

FOREIGN PATENT DOCUMENTS

| DE | 829 096 C | | 1/1952 | |
|---|---|---|---|---|
| DE | 1064275 B | * | 8/1959 | ............. B60B 21/10 |
| DE | 1082822 B | * | 6/1960 | ............. B60B 25/04 |
| DE | 16 05 629 C3 | | 7/1975 | |
| DE | 2712242 A1 | * | 10/1977 | ............. B60C 17/06 |
| DE | 3705952 A1 | * | 9/1988 | ............. B60C 17/04 |
| DE | 10 2007 049 767 A1 | | 4/2009 | |
| EP | 0 100 013 A2 | | 2/1984 | |
| EP | 0 299 190 A1 | | 1/1989 | |

(Continued)

OTHER PUBLICATIONS

French Preliminary Search Report dated Jul. 21, 2015 in French Application 14 60860, filed on Nov. 10, 2014 (with English Translation of Categories of Cited Documents).

*Primary Examiner* — Kip T Kotter
(74) *Attorney, Agent, or Firm* — Oblon, McClelland, Maier & Neustadt, L.L.P.

(57) ABSTRACT

A wheel for working the fields comprises a wheel body comprising a pair of flanges and a spacer, and a tire cover, generally annular, comprising two side walls, a tread connecting the side walls to one another and an opening opposite to the tread. The tire cover is mounted on the wheel body in such a way that the spacer is positioned across its opening. The flanges are arranged in such a way as to block the side walls of the tire cover against the spacer in the vicinity of the opening.

8 Claims, 11 Drawing Sheets

(56) References Cited

FOREIGN PATENT DOCUMENTS

| | | | |
|---|---|---|---|
| EP | 0 245 648 B2 | 4/1992 | |
| EP | 0 223 134 B2 | 7/1995 | |
| EP | 2 000 328 A1 | 12/2008 | |
| FR | 2 938 726 A1 | 5/2010 | |
| IT | 2514744 A1 * | 10/1976 | ............. B60B 25/04 |

* cited by examiner

AGRICULTURAL WHEEL

The invention relates to the field of agricultural implements, particularly wheels for working the fields.

These wheels are used to work the soil, for example to form furrows therein before depositing a seed or a grain therein, and afterwards to close the furrows up again or to compact the soil. They may also be used as a gauge wheel to set the working height of nearby implements.

Generically, these wheels comprise a wheel body and a tyre cover, generally annular, mounted around the wheel body, at the periphery thereof. The wheel body is produced fairly rigidly, allowing the loads necessary for working the soil to be transmitted. The tyre cover is produced in such a way that it deforms slightly during work, preventing it from fouling, notably encouraging it to become unstuck from the soil. Usually it is made of elastomer. It is used in an uninflated state, which means to say that the inside of the tyre cover is in fluidic communication with the outside thereof.

Conventionally, the tyre cover has a closed profile: it comprises a part forming a sole, via which the tyre cover is mounted on the wheel body, a part forming a tread, and two parts forming side walls each of which connects the sole to the tread. The sole may notably include a portion that projects radially inward, in the manner of a bead. This bead is used to secure the tyre cover to the wheel body. In particular, it may be trapped between two flanges belonging to the wheel body, for example mounted one on the other.

Overall, existing wheels operate satisfactorily. However, they can prove fairly complex to manufacture.

The applicant company has set itself the objective of improving the situation.

It proposes a wheel for working the fields, comprising:
a wheel body comprising a pair of flanges, and
a tyre cover, generally annular, comprising two parts forming side walls and one part forming a tread connecting the side walls to one another. The tyre cover has an opening opposite to the tread. The wheel body further comprises at least one part forming a spacer. The tyre cover is mounted on the wheel body in such a way that the spacer is positioned across its opening. The flanges are arranged in such a way as to block the side walls of the tyre cover against the spacer at least in the vicinity of the opening.

In general, the proposed wheel is simpler to manufacture than the conventional wheels.

In particular, the opening gives the tyre cover an open profile that greatly simplifies the manufacture thereof. The tyre cover can be produced by moulding with injection moulds of simple shape, unlike the conventional tyre covers with a closed profile. The latter require moulds of complex shape, combined with systems for injection of air under pressure or with suspended cores in order to form an internal cavity. The conventional closed-profile tyre covers may also be produced by extrusion/joining. They therefore need to be manufactured whilst combining such operations in succession. The conventional methods of manufacture comprise a high number of manual operations, for which precautions of a health and safety nature need to be taken, these precautions notably relating to the handling of substances harmful to health, temperatures, and painfulness.

Here, the raw material can simply be spread in the moulds using conventional injectors or under gravity. Repeatability is improved. In particular, better control can be had over the tolerances on tyre cover thickness.

Practically all of the surface of the mould in contact with the raw material can easily be raised to a desired temperature which is dependent on the properties of the materials used. This on the other hand is difficult if not impossible with a closed-profile tyre cover for which a core needs to be provided. This results in a more uniform material temperature, obtained more rapidly, thereby speeding up the steps of heating/cooling for baking, polymerizing and/or crosslinking including vulcanization. For the same reasons, the return of the tyre cover to ambient temperature at the end of the process is likewise swifter and more uniform.

The open profile of the tyre cover makes it easier to demould. The deformability and elasticity of the tyre cover can be used to extract part of the mould through the opening of the tyre cover. In practice, demoulding can be performed manually.

The soft material, such as an elastomer, used to manufacture the tyre cover is generally more expensive than the materials of the rigid parts of the wheel body. The absence of a sole in the tyre cover of the proposed wheel allows a raw-material saving by comparison with the conventional tyre covers.

The manufacturing cycle for the proposed wheel is shortened, and its cost generally reduced.

According to another aspect, the applicant company proposes a kit intended to form a wheel comprising:
a pair of flanges, and
a tyre cover, generally annular, comprising two parts forming side walls and a part forming a tread connecting the side walls to one another. The tyre cover has an opening opposite to the tread. The kit further comprises at least one part forming a spacer. The tyre cover mounting on a wheel body in such a way that the spacer is positioned across its opening. The flanges assembling with the spacer to form the wheel body in such a way as to block the side walls of the tyre cover against the spacer at least in the vicinity of the opening.

The wheel and the kit may have the following optional features alone or in combination with one another:

at least one of the side walls is locked by a respective flange through collaboration of shapes. This then reduces the risk of the tyre cover becoming detached from the flanges and from the spacer during operation. The collaboration between shapes opposes any movement of the tyre cover, particularly in the radial direction, with respect to the flanges and to the spacer. During the assembly operations, the collaboration between shapes makes it easier to position and index the tyre cover with respect to the flanges and to the spacer.

at least one of the side walls of the tyre cover comprises a lip in the vicinity of the opening and at least one of the flanges and of the spacer comprises a cavity arranged in collaboration of shape with the lip. The lip strengthens the free end of the side wall that bears it and limits the risk of damage, wear or tearing both during manufacture and during use. The lip may take the form of a cord.

the spacer comprises an active part arranged, when not loaded, near the tread and under the latter. The tyre cover and the active part are arranged relative to one another in such a way that, under load, the tread collapses and hugs the shape of the underlying active part. The tread then forms impressions in the ground that correspond substantially to the shape of the active part. It is generally easier to make the spacer rigid with complex shapes than to create similar shapes on the exterior surface of the soft tyre cover. Similar tyre covers can be used with spacers of different shapes in order to create wheels with varying functions. In other words, mass production of identical tyre covers may be all that is required to suit different wheels. The tyre cover deforms each time it is compressed by the spacer and each time the spacer moves away. When running over sticky soil, these deformations encourage the soil to become unstuck from the exterior surface of the tyre cover.

The active part in cross section has one of the following shapes:

i) a dome having an axis of symmetry perpendicular to an axis of rotation of the wheel, and ii) two domes joined together by a cavity and having an axis of symmetry perpendicular to an axis of rotation of the wheel. According to the embodiment, it is possible to form one furrow or two furrows for each pass of a single wheel. As circumstances dictate, the user may interchange spacers of different shapes, reusing the same flanges and/or the same tyre cover.

The active part has a cross section of asymmetric shape. Wheels of this type can then be used in a setup including a pair of wheels, for example to work the land on each side of a furrow. The wheels of this type may be mounted for rotation about an axis that is substantially inclined with respect to the vertical and/or substantially not perpendicular to the direction of forward travel of the agricultural machine.

The active part has a cross section that varies. The effect produced on the soil varies along the forward travel of such a wheel. The pressure applied to the tyre cover by the spacer is discontinuous along the circumference. Portions of the tread of the tyre cover have the freedom to move in operation. Stresses experienced by the tyre cover can then be relieved more easily and the risk of deterioration is reduced.

The side walls and the tread have similar thicknesses to one another. With the exception of potential shapes intended to lock the fixing of the tyre cover, the side walls and the tread may have a substantially continuous appearance. When a heating and/or cooling operation is employed to manufacture the tyre cover, the diffusion of heat within the material of which the tyre cover is made is rapid and uniform. The duration of the production cycles and the costs of manufacture are further reduced.

Further features, details and advantages of the invention will become apparent from reading the detailed description which follows, and from studying the attached drawings in which.

The drawings and the description below essentially contain elements of a certain nature. They can therefore be used not only to make the present invention easier to understand but also to contribute toward defining it, where appropriate. It should be noted that elements such as the geometry of the wheels are difficult to define in full, in any other manner than by drawing them.

Figure 7:
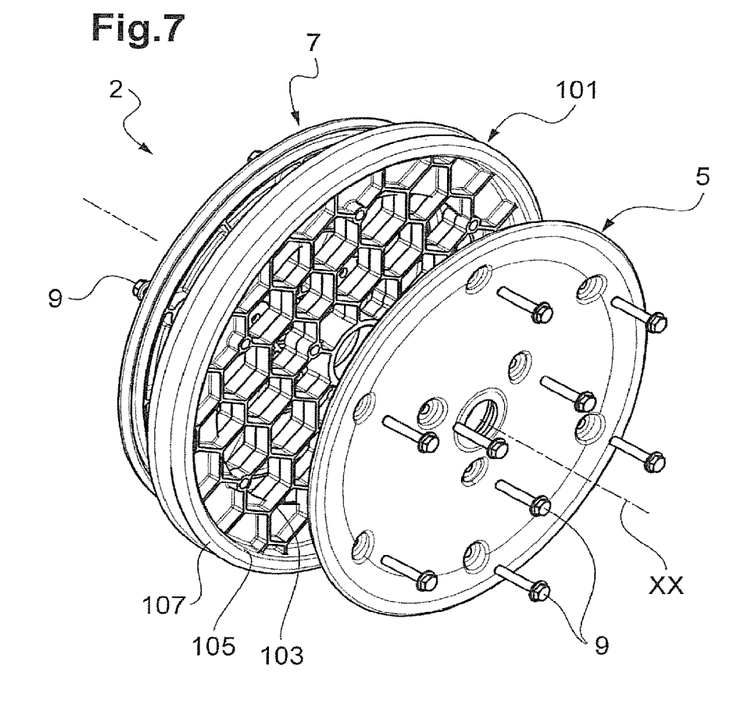
FIG. 7 shows an exploded and perspective view of the subject matter of FIG. 4.
Figure 8:
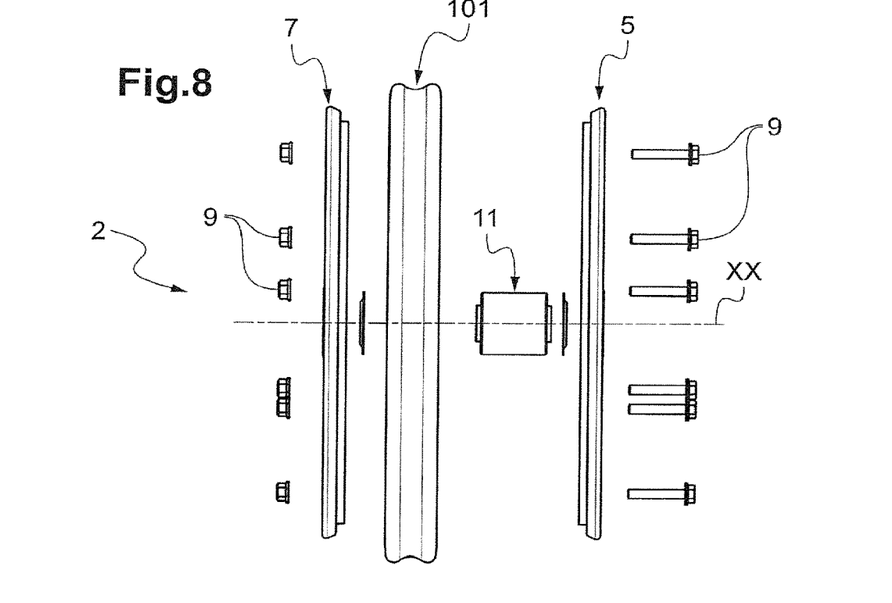
FIG. 8 shows an exploded and face-on view of the subject matter of FIG. 4.
Figure 9:
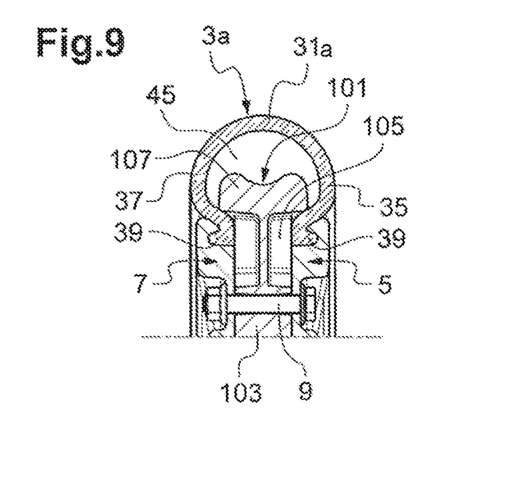
FIGS. 9 and 10 show detailed and sectional views of two alternative forms of the wheel of FIG. 1.
Figure 10:
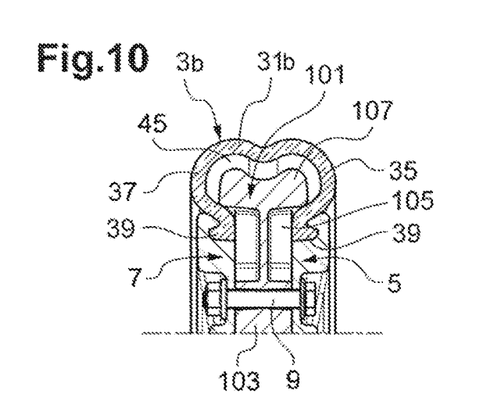

FIGS. 1 to 11 show a first embodiment of a wheel 1 for working the field. FIGS. 9 and 10 depict two alternative forms of the first embodiment. The wheel 1 comprises a tyre cover 3, a pair of flanges 5, 7, fixings 9, a bearing assembly 11 and a spacer 101. When mounted on an agricultural machine, the wheel 1 has an axis of rotation represented as a broken line and referenced XX in the figures.

The wheel 1 has a mid plane perpendicular to the axis of rotation XX. The mid plane constitutes a plane of symmetry of the wheel 1, apart from a few exceptions. For example, the fixings 9 and the bevel shape visible in FIGS. 14 to 17 are exceptions to this rule of symmetry.

In the example described here, the two flanges 5 and 7 are similar to one another and symmetric with respect to one another about the mid plane. Each flange 5, 7 is in the overall shape of a disc having an interior face and an exterior face. The spacer 101 also has the overall shape of a disc and has two main faces similar to one another.

In alternative forms, other parts such as the flanges 5, 7, the tyre cover 3 and/or the spacer 101 may be asymmetric about the mid plane.

Each of the flanges 5, 7, at its centre, has a through-opening from the exterior face to the interior face. The opening has a substantially circular outline. The spacer 101 at its centre has a through-opening from one of its main faces to the other. The opening has a substantially cylindrical outline. Each of the flanges 5, 7 and of the spacer 101 has through-passages passing from one of its faces to the other for the fixings 9.

In an assembled state, the interior faces of the flanges 5, 7 are respectively mounted against one and the other of the two main faces of the spacer 101. The spacer 101 is sandwiched between the two flanges 5, 7. The central openings are aligned with one another about the axis of rotation XX. The through-passages of the spacer 101 for the fixings 9 are aligned with the corresponding through-passages of each of the two flanges 5, 7.

The two flanges 5, 7 and the spacer 101 are held together by the fixings 9 arranged in the passages provided for that purpose. In this instance, the fixings 9 comprise screw-nut pairs. The head of the screw and the corresponding nut bear against the exterior face of one or other of the two flanges 5, 7, on the outline of the through-passages. The assembly formed by the two flanges 5, 7, the spacer 101 and the fixings 9 can be seen as a wheel body 2.

The wheel body 2, 2a, 2b, 2c, 2d, and 2e of various embodiments thus formed has a through-opening centred on the axis of rotation XX. The parts of the wheel body 2 surrounding the opening form a hub of the wheel 1. This opening is shaped into an open housing able to accommodate the bearing assembly 11.

In the cross-sectional figures, the bearing assembly 11 is depicted schematically as a cross. Each of the flanges 5, 7 comprises, on the side of its exterior face, a substantially annular rim protruding radially inward with respect to the bore of the central opening of the spacer 101. Each of these rims forms an axial stop for the bearing assembly 11 so as to limit its sliding in the axial direction XX and hold it between the two flanges 5, 7. In this instance, the housing provided to accommodate the bearing assembly 11 is designed to accommodate a bearing assembly 11, or bearing unit 11, as known per se. The bearing assembly 11 takes the form of a cartridge ready to be installed in the wheel body 2.

The bearing assembly 11 has a bore centred on the axis of rotation XX and opening on each side of the wheel body 2. The bore of the bearing assembly 11 is designed to be slipped onto an axle of an agricultural machine.

Figure 3:
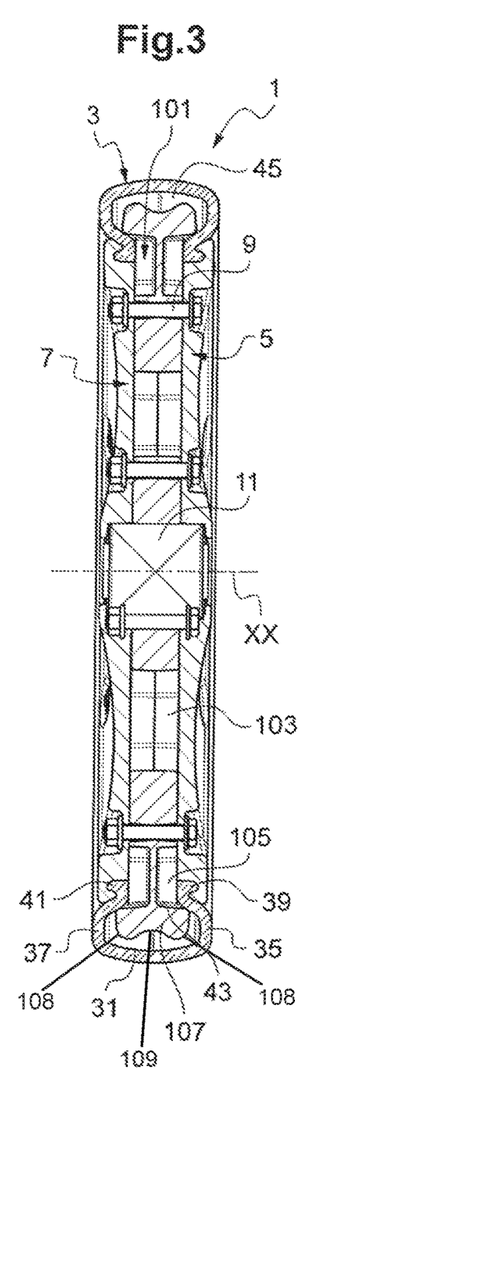
FIG. 3 shows a view in cross section of the wheel of FIG. 1.
Figures 4, 5, 6:
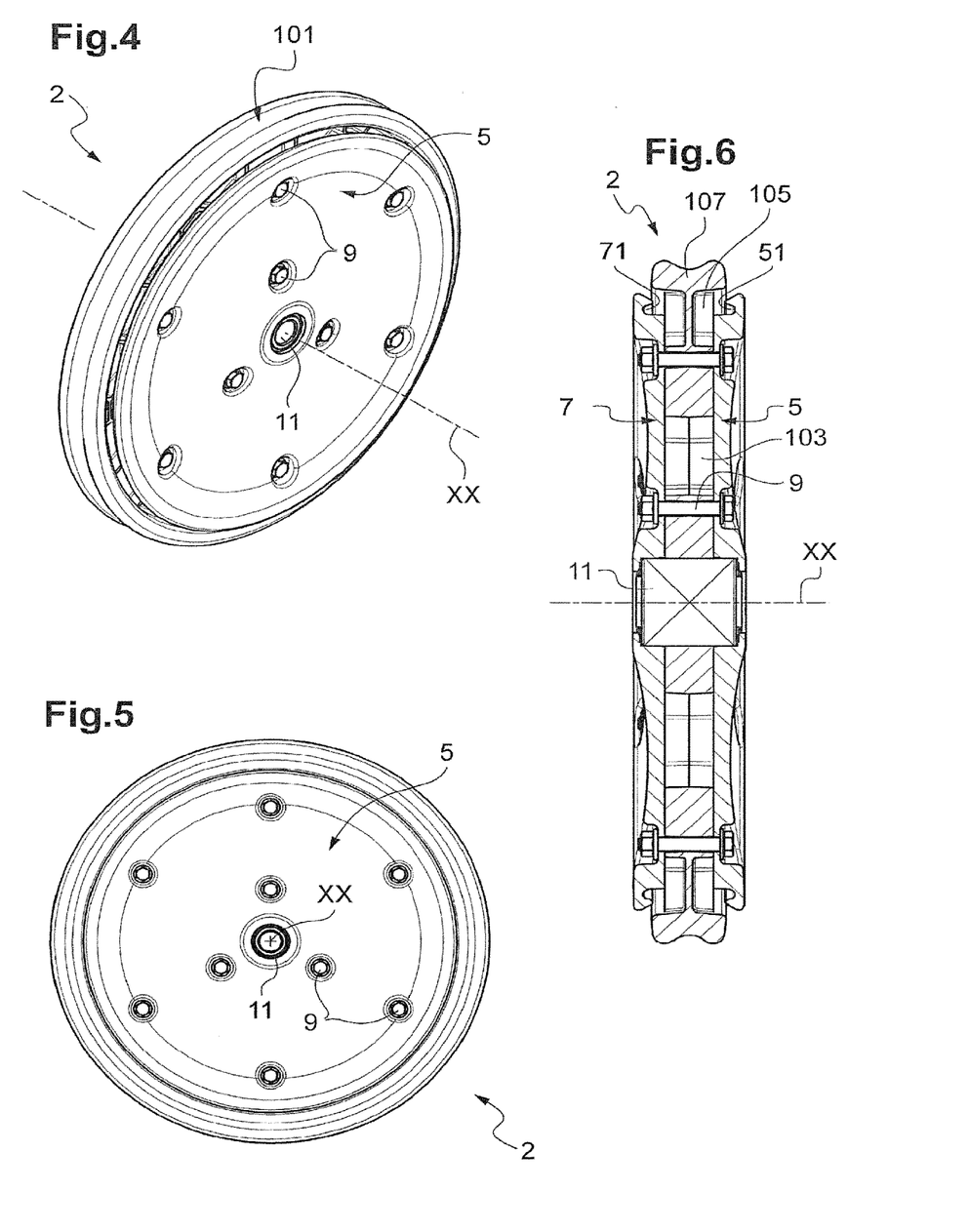
FIG. 4 shows a view similar to that of FIG. 1 with the tyre cover absent.
FIG. 5 shows a view similar to that of FIG. 2, with the tyre cover absent.
FIG. 6 shows a view similar to that of FIG. 3, with the tyre cover absent.

In the example described here, the spacer 101 comprises a central part 103, an intermediate part 105 and, at its periphery, an active part 107. In the embodiment of FIG. 3, the active part includes two domes 108 and a cavity 109. Aside from the central opening and the openings for the fixings 9, the central part 103 of the spacer 101 is, to a large extent, hollow. As may be seen in FIG. 7, the central part 103 here has a honeycomb configuration. The honeycomb structure opens onto each of the main faces of the spacer 101. Such a structure gives the spacer 101 good mechanical strength in operation while at the same time being light in weight.

In alternative forms, the spacer 101 has no central part 103 and has the overall shape of an annulus. In this case, the flanges 5, 7 are mounted directly against one another or via one or more additional insert pieces. In alternative forms, the central part 103 is solid or partially hollowed.

The intermediate part 105 of the spacer 101 is fixed between the flanges 5, 7 near a peripheral edge of each of the flanges 5, 7. In the example described here, the active part 107 of the spacer 101 projects radially outward with respect to the respective peripheral edges of the flanges 5, 7. In alternative forms, the active part 107 is absent. In that case, the intermediate part 105 has a peripheral edge more or less aligned with the respective peripheral edges of the flanges 5, 7 or set back from the respective peripheral edges of the flanges 5, 7.

Each flange 5, 7 here comprises a respective cavity 51, 71. Each of the cavities 51, 71 takes the form of a groove formed substantially along the periphery of the corresponding flange 5, 7. Each of the cavities 51, 71 is formed from the interior face of the corresponding flange 5, 7. In the assembled state depicted in FIGS. 4 to 6, the two cavities 51, 71 open substantially facing one another. The peripheral edge of each of the flanges 5, 7 surrounding the respective cavity 51, 71 forms a hook retaining rim for the tyre cover 3.

In the example described here, the flanges 5, 7 and the spacer 101 are based on a rigid substantially non-deformable material. For example, in this instance, metallic materials. As an alternative, plastics materials may be used, such as glass fibre reinforced polypropylenes or polyamides. In this context, the terms "rigid" and "non-deformable" seek to distinguish the wheel body 2, comprising the flanges 5, 7 and the spacer 101, from the somewhat soft and deformable tyre cover 3. The spacer 101 as an alternative is made of a material that is more rigid than that of the tyre cover 3 but softer than that of the flanges 5, 7. This allows certain shocks to be absorbed, particularly when the wheel 1 operates at high speed over uneven ground. For example, high-hardness rubbers may be used.

In the example described here, each of the flanges 5, 7 is made as a single piece. The spacer 101 is also made as a single piece.

The tyre cover 3 has an annular overall shape. The tyre cover 3 comprises two parts forming side walls 35, 37 and a part forming a tread 31, 31a, 31b, 31c, 31d and 31e in respective embodiments connecting the side walls 35, 37 to one another. The tyre cover 3 here is made as a single piece.

The tyre cover 3 has no sole. The tyre cover 3 has an opening 43 opposite to the tread 31. When viewed in profile and as depicted in FIGS. 3, 9, 10 and 11, the tyre cover 3 in cross section has the overall shape of a U.

In this instance, the tyre cover 3 comprises two lips, 39, 41. The lips 39, 41 are configured in a free end portion of the side wall 35, 37, respectively, opposite to the tread 31. The lips 39, 41 of the tyre cover 3 are positioned near the opening 43, in this instance on each side of the opening 43. The lips 39, 41 form additional thicknesses with respect to the rest of the side walls 35, 37. The lips 39, 41 project from the side wall 35, 37, respectively, in the direction of the axis of rotation XX toward the outside of the tyre cover 3, namely in opposite directions from one another.

In the example described here, the tyre cover 3, with the exception of the lips 39, 41, is of substantially uniform thickness. The side walls 35, 37 and the tread 31 have similar thicknesses to one another. As an alternative, the thicknesses may be different. For example, the tread 31 may be thicker than the side walls 5, 7.

The lips 39, 41 of the tyre cover 3 and the cavities 51, 71 of the side walls 5, 7 are shaped to collaborate in pairs.

Figure 1:
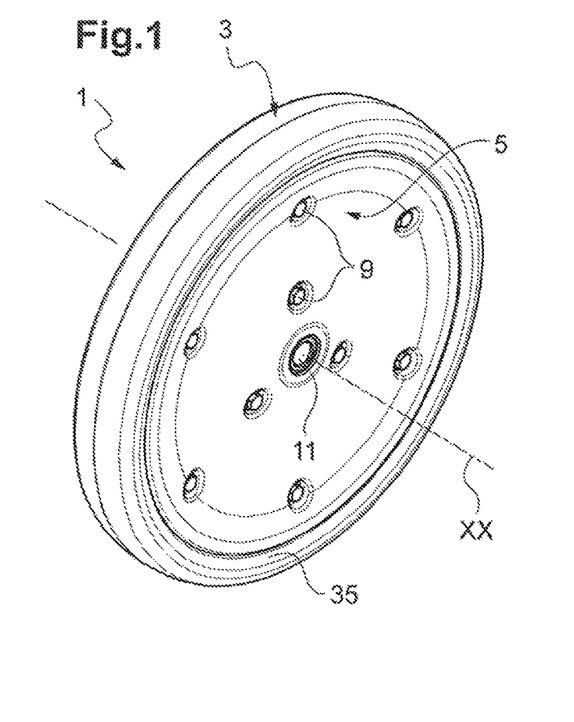
FIG. 1 shows a perspective view of a wheel according to the invention at rest.
Figure 2:
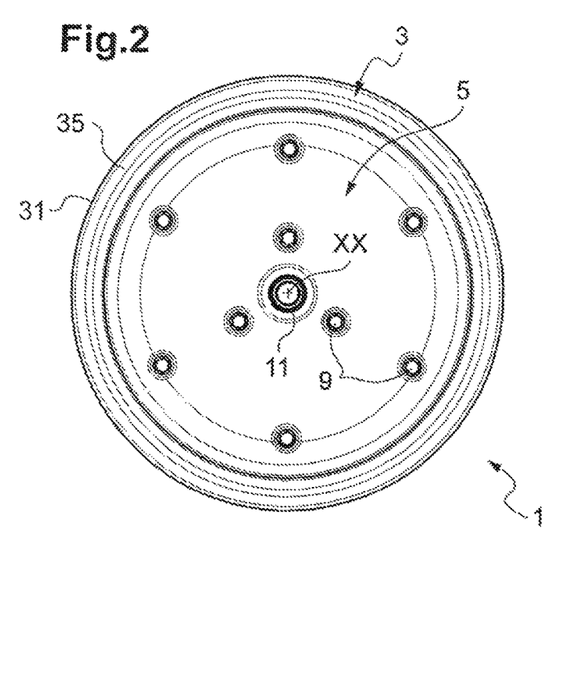
FIG. 2 shows a side view of the wheel of FIG. 1.

When the wheel 1 is in the assembled state depicted in FIGS. 1 to 3, the tyre cover 3 is held by the wheel body 2. The spacer 101 of the wheel body 2 is positioned across the opening 43 of the tyre cover 3. The flanges 5, 7 are arranged in such a way that each blocks a respective side wall 35, 37 in the vicinity of the opening 43 by pressing against the spacer 101 and in such a way as to hold the tyre cover 3 and the spacer 101 together.

Each lip 39, 41 of the tyre cover 3 is housed in the cavity 51, 71, respectively, of the respective flanges 5, 7. In other words, part of the side wall 35 of the tyre cover 3 is sandwiched, pinched, between the flange 5 and the intermediate part 105 of the spacer 101, while part of the side wall 37 is sandwiched, pinched, between the flange 7 and the intermediate part 105 of the spacer 101. The fixings 9 maintain clamping substantially in the direction of the axis of rotation XX. The spacer 101 is clamped between the two flanges 5, 7 at least partially via the side walls 35, 37 of the tyre cover 3.

Here, the collaboration of shapes of the lips 39, 41 of the tyre cover 3 and of the cavities 51, 71 of the flanges 5, 7 improve the clamped retention. The risk of localized and accidental separation of the tyre cover 3 from the wheel body 2 in a radial direction is reduced.

In alternative forms, the position of the lips and of the cavities is reversed; the flanges 5, 7 have a convex or male shape while the side walls 35, 37 of the tyre cover 3 have a corresponding concave or female shape. In alternative forms, the cavities 51, 71 are formed in the intermediate part 105 of the spacer 101, while the lips 39, 41 of the tyre cover 3 are oriented to face one another so as to be inserted in the cavities 51, 71.

In alternative forms, the side walls 35, 37 of the tyre cover 3 have no lips 39, 41. The flanges 5, 7 have no cavities 51, 71. Locking through collaboration of shapes is absent. In such cases, the parts of the side walls 35, 37 of the tyre cover 3 in the vicinity of the opening 43 are held between the two flanges 5, 7 by clamping oriented in the direction of the axis of rotation XX. Sufficient clamping and the friction forces between the tyre cover 3 and the wheel body 2 prevent the tyre cover 3 from becoming detached from the wheel body 2.

The collaborations of shapes set out hitherto are substantially symmetric about the mid plane perpendicular to the axis of rotation XX. The case may be otherwise. The tyre cover 3 and/or the wheel body 2 may be asymmetric about the mid plane.

The tyre cover 3 has a configuration and a composition that make it deformable. The tyre cover 3 is based on an elastomeric material, in this instance polyurethane. Polyurethane has good performance in deformation and good integrity over time. Polyurethane is also more hydrophilic than other elastomers such as rubber. This hydrophilic nature at once makes demoulding operations at the time of manufacture easier and also makes it easier for soil to become unstuck during operation. In combination with the configuration of the tyre cover 3, the use of polyurethane improves the operational performance while at the same time limiting manufacturing costs. As an alternative, rubber may be used. The dimensions of the tyre cover 3, particularly the thickness thereof, are chosen so as to allow the tyre cover 3 to be deformed manually. For example, the opening 43 can be enlarged by pulling the side walls 35, 37 apart, in the direction of the axis of rotation XX, using hand pressure alone. This makes the operations of demoulding and assembling the wheel 1 easier.

In general, the tyre cover 3 may be produced using techniques known per se in the field of tyres. The tyre cover 3 here is produced by moulding. In the unassembled state and as can be seen in FIG. 3, the profile of the tyre cover 3 defines an interior space 45. The interior space 45 is delimited, in a radial direction, between the tread 31 and the opening 43. The interior space 45 is delimited, in an axial direction, between the side walls 35, 37. In the unassembled state, the interior space 45 is in communication with the outside via the opening 43. At the time of moulding, the interior space 45 is formed by means of a corresponding convex part of a mould. After moulding, the convex part of the mould is removed from the interior space 45 of the tyre cover 3. The maximum dimension of the interior space 45 in the axial direction XX is, in this case, greater than the dimension of the opening 43 in the axial direction XX. In order to extract the convex part of the mould occupying the interior space 45 through the opening 43, the tyre cover 3 is deformed. The greater the extent to which the tyre cover 3 is elastically deformable, the more the opening 43 can be enlarged and the easier demoulding will be.

The substantially uniform thickness of the tyre cover 3 improves the evenness of heating/cooling during moulding. The spread of heat energy from the mould and spreading into the material of which the tyre cover 3 is made becomes easier. From another viewpoint, each part of which the tyre cover 3 is made is situated a short distance away from an exterior surface and therefore near a surface of the mould the temperature of which surface is controlled. The spread of heat to the heart of the material, and therefore the thermalization, is rapid. The risk of having portions of the tyre cover 3 exhibiting incomplete crosslinking is lower.

As may be seen in FIG. 3, the interior space 45 of the tyre cover 3 in the assembled into a wheel 1 state is partially occupied here by the active part 107 of the spacer 101.

An example of an assembling of the wheel 1 is now described on the basis of FIGS. 7 and 8. First of all, the spacer 101 is inserted at least partially through the opening 43 into the interior space 45 of the tyre cover 3. As can be seen in FIG. 3, the maximum dimension of the active part 107 of the spacer 101 in the axial direction XX may be greater than the minimum dimension of the opening 43 of the tyre cover 3 at rest, in the axial direction XX. As a result, inserting the spacer 101 into the interior space 45 of the tyre cover 3 entails enlarging the opening 43 of the tyre cover 3. To do that, the side walls 35, 37 are parted from one another using the deformability and elasticity of the tyre cover 3. The outside diameter of the spacer 101 is greater than the inside diameter of the tyre cover 3 at rest. As a result, the spacer 101 is inserted into the tyre cover 3 using the deformability and elasticity of the tyre cover 3 in the radial directions. The configuration and composition of the tyre cover 3 are selected so that the assembly operations can be performed by hand by an operator, possibly with some tools.

In alternative forms, the spacer 101 is made up of several pieces assembled with one another. In such a case, the spacer 101 can be inserted component by component into the interior space 45 of the tyre cover 3. The components are then assembled fixedly to one another. In a first alternative form, the spacer 101 is made by assembling several angular ring portions. For example, two, three, four or five angular portions make up the 360° of the ring. In a second alternative form, the spacer 101 is produced by assembling several annular sections assembled with one another along joining planes substantially perpendicular to the axis of rotation XX. For example two, three, four or five annular sections make up the width of the ring. Such configurations of the spacer 101 make it possible for example to limit or dispense with elastic deformation of the tyre cover 3 at the time of assembly.

Once the spacer 101 has been installed inside the tyre cover 3, the flanges 5, 7 are brought closer together on each side of the tyre cover 3. As can be seen in FIG. 8, the bearing assembly 11 is positioned between the two flanges 5, 7 during this operation. The flanges 5, 7 are then held together by means of the fixings 9, in this instance the screw-bolt pairs. Other fixing means may be used, for example clip-fastening or hook systems.

FIGS. 3, 9 and 10 depict embodiments of wheels 1 for which the spacers 101 are similar to one another, while the shapes of the tyre covers 3 at rest differ from one another. In FIG. 3, the tread 31*a* is slightly domed. In FIG. 9, the tread 31a of tyre cover 3a has a substantially semicircular shape. In FIG. 10, the tread 31a has a double dome shape.

The shapes of the tread 31 are obtained at the time of moulding of the tyre cover 3. The tyre tread 31 may, as an alternative, exhibit other shapes according to the desired application.

At rest, the active part 107 of the spacer 101 occupies just part of the empty space 45. A portion of the empty space 45 of the tyre cover 3 remains unoccupied, notably under the tread 31. In embodiments without an active part 107, the empty space 45 remains unoccupied. In the examples described here, the interior space 45 remains in fluidic communication with the outside of the wheel 1, for example via an orifice in the spacer 101 (orifice not shown). Therefore the interior space 45 is neither inflated nor inflatable. The absence of inflation makes it easier for the tyre cover 3 to deform during operation. Deformation of the tyre cover 3 makes it easier for any earth that may build up on the exterior surface of the tyre cover 3 to detach therefrom during use.

Figure 11:
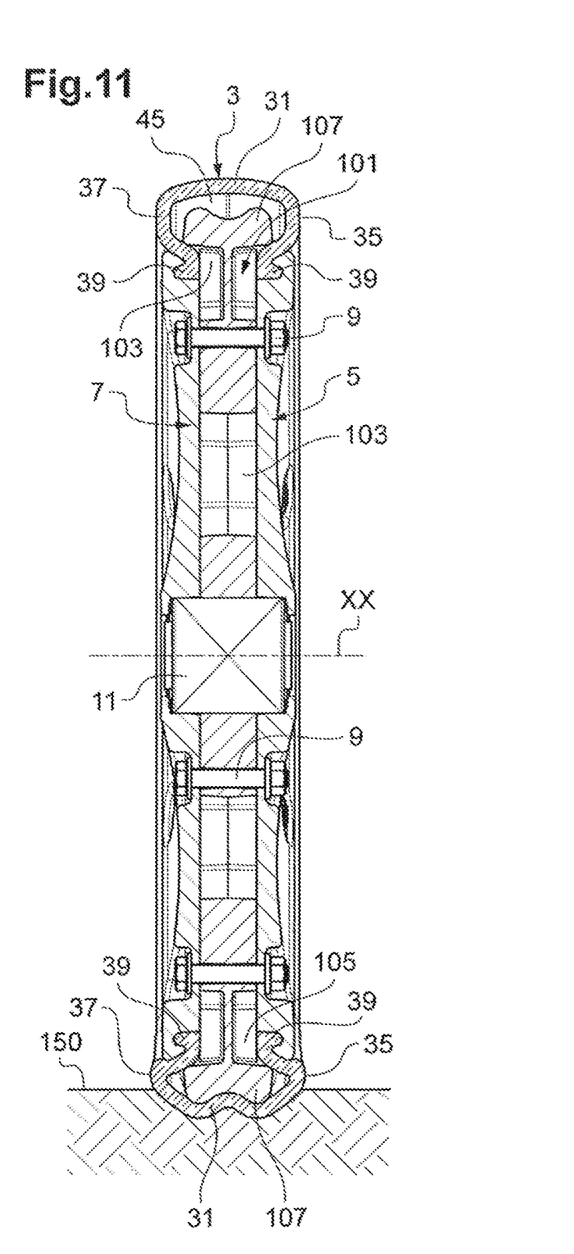
FIG. 11 shows a view in cross section of the wheel of FIG. 1 in operation.
Figure 12:
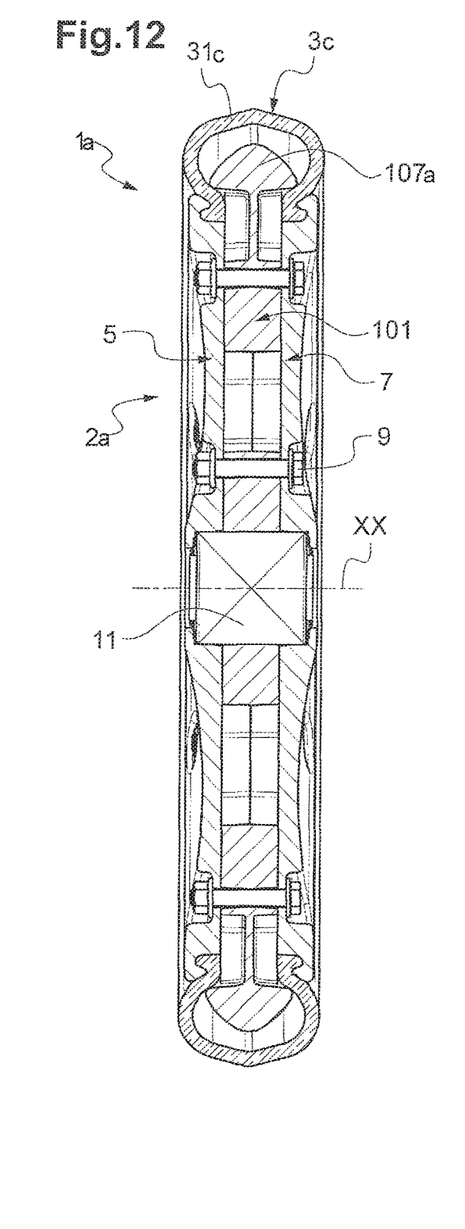
FIG. 12 shows a view in cross section of a wheel according to the invention at rest.
Figure 13:
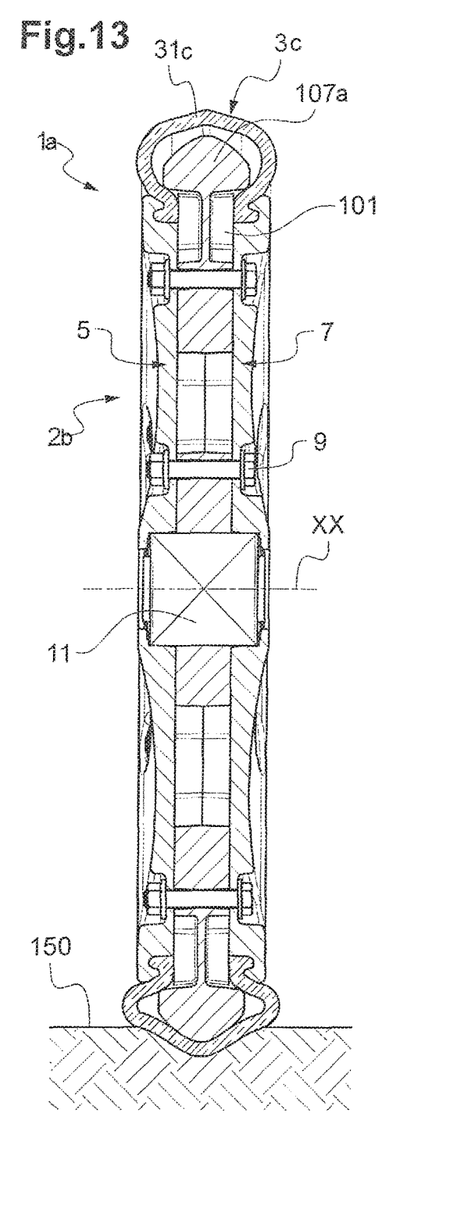
FIG. 13 shows a view in cross section of a wheel according to the invention in operation.

FIG. 11 depicts a view in cross section of the wheel 1 in operation, which means to say when running over loose ground 150. The wheel 1 of FIG. 11 is under stress. The active part 107 is positioned close under the tread 31 in the part of the wheel 1 that is not in contact with the ground (at the top in FIG. 11).

Under the effect of the weight of the wheel 1 and of part of the agricultural machine, the active part 107 of the spacer 101 housed in the empty space 45 of the tyre cover 3 presses against an interior surface of the tread 31 in the part of the wheel 1 that is in contact with the ground (at the bottom in FIG. 11). The tread 31 is compressed between the active part 107 of the spacer 101 and the ground 150. The spacer 101 and the active part 107 are arranged relative to one another in such a way that, under load, the tread 31 collapses and hugs the shape of the active part 107. In the example of FIG. 11, the tread 31, viewed in cross section, adopts the shape of a double dome. The surface of the ground 150 is compressed and takes on a shape that complements that of the active part 107 of the spacer 101, via the tread 31. Impressions are therefore formed in the ground 150.

The surface of the ground 150 is worked according to the shape of the active part 107 of the spacer 101. The shape of the active part 107 of the spacer 101 is adapted to suit the shapes to be created in the ground 150.

The interposition of the tread 31 of the tyre cover 3 between the active part 107 of the spacer 101 and the ground 150 makes it possible to avoid direct contact between the spacer 101 and the soil of the ground 150. When the soil is sticky, it may temporarily stick to the tyre cover 3 without coming into contact with the inside of the tyre cover 3 or the spacer 101. During running, the tyre cover 3 deforms and for example reverts to its initial shape depicted in the upper part of FIG. 11. The successive deformations encourage any soil which may have stuck to the tyre cover 3 to become unstuck.

In FIG. 10, the shape of the tyre cover 3b at rest is more or less tailored to the shape of the active part 107 of the spacer 101 associated with it. Such tailoring makes it possible to limit the risks of unwanted bending of the tyre cover 3 during running. Deterioration of the tyre cover 3 is limited.

The shapes of the tyre cover 3 depicted in FIGS. 9 and 11 allow greater distance between the tread 31, 31a at rest and the active part 107. Thus, the deformation movements of the tyre cover 3 during operation are greater. Soil detachment is improved.

Figures 14, 15, 16:
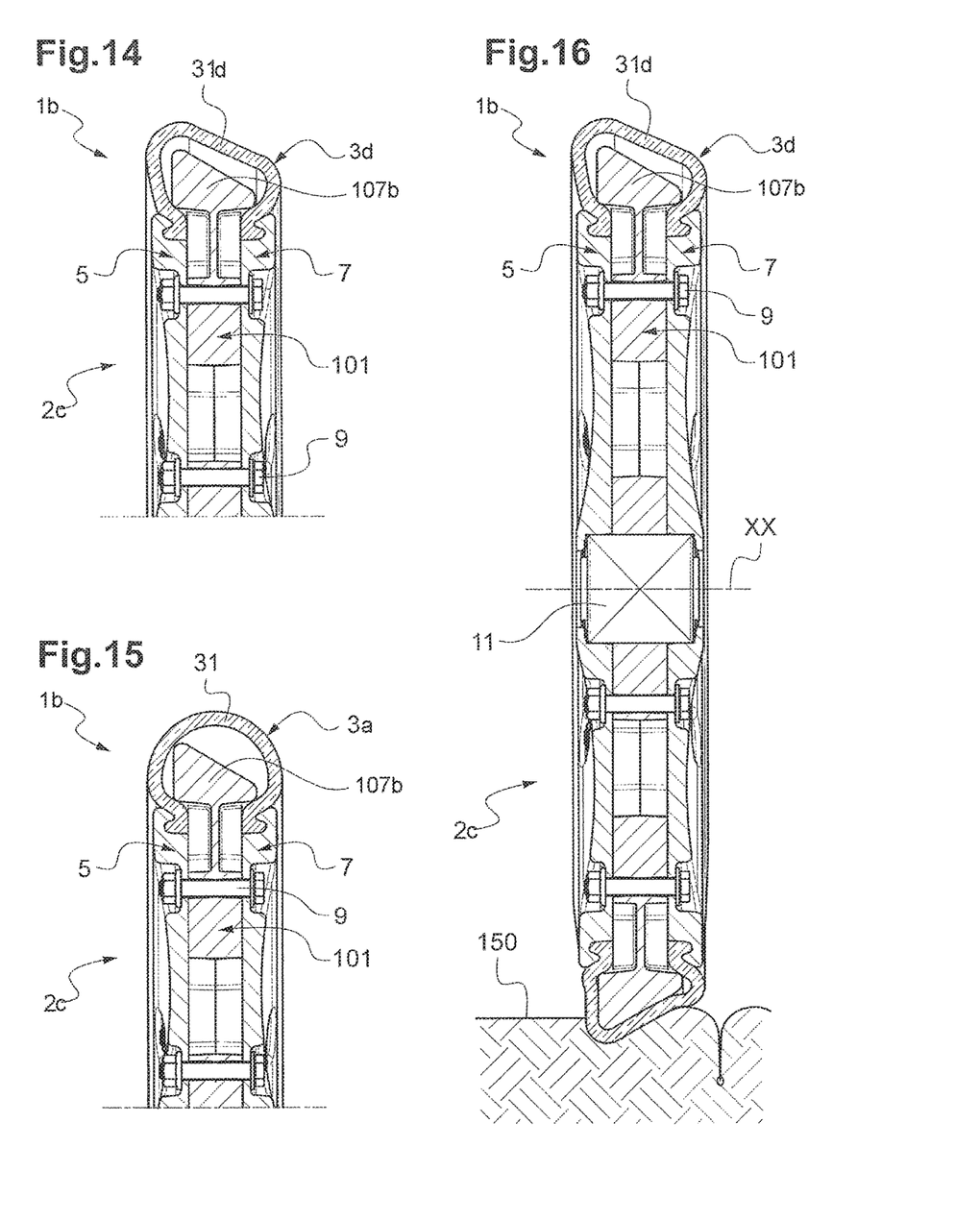
FIGS. 14 and 15 show detailed and sectional views of two wheels according to the invention.
FIG. 16 shows a view in cross section of the wheel of FIG. 14 in operation.
Figure 17:
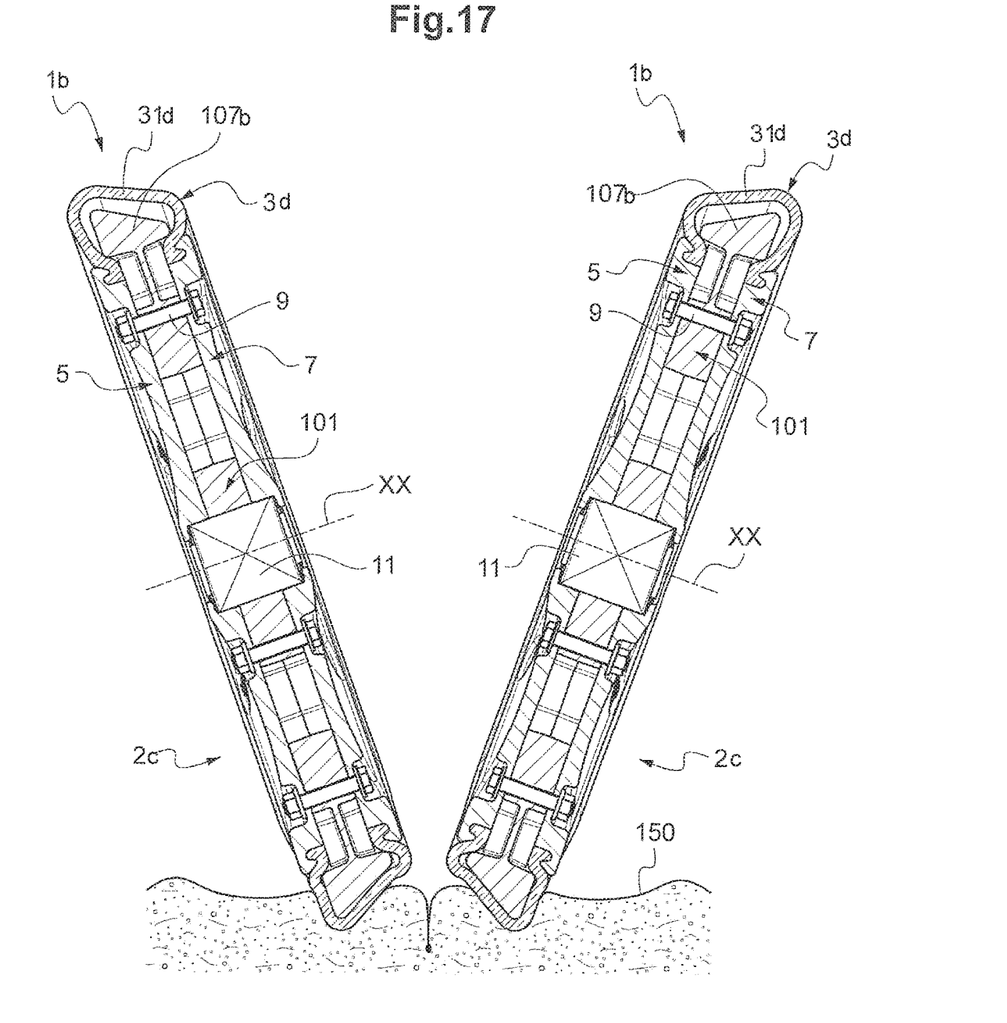
FIG. 17 shows a view in cross section of a pair of wheels which are similar to that of FIGS. 14 and 16 in operation in a V-setup.
Figure 18:
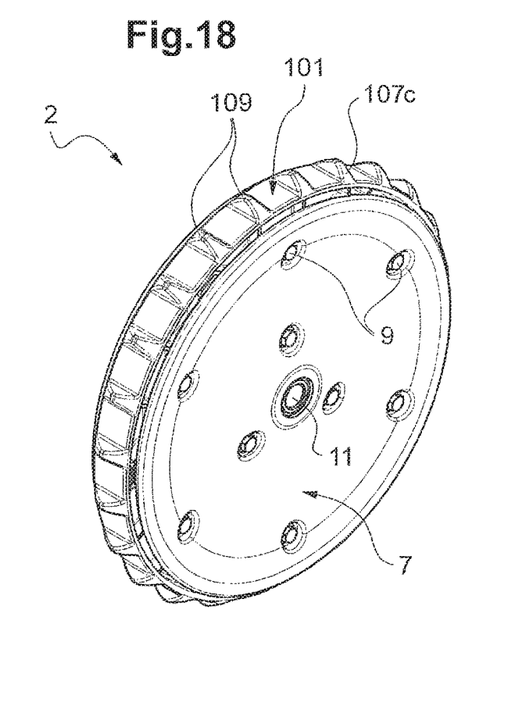
FIG. 18 shows a perspective view of a wheel according to the invention with the tyre cover absent.
Figure 19:
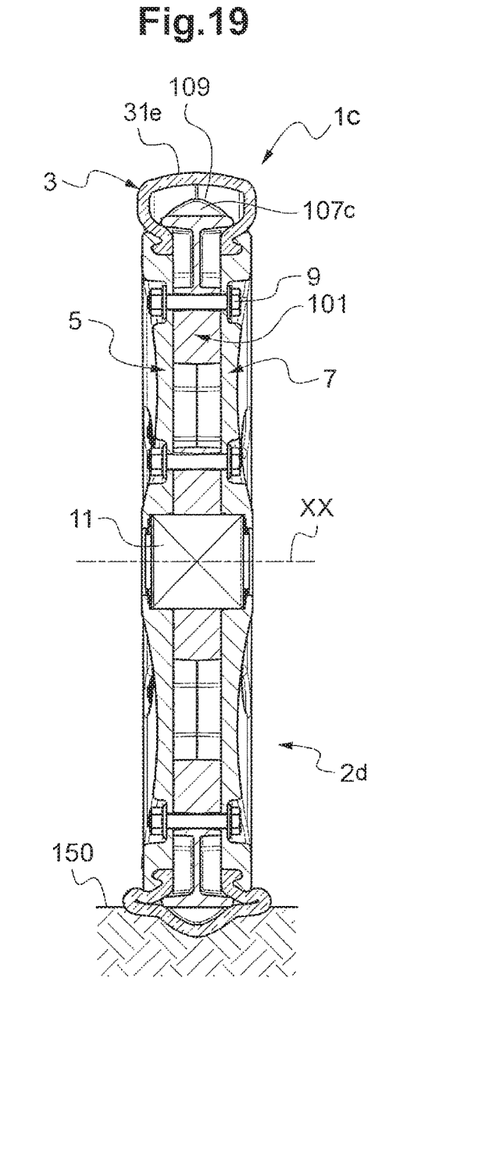
FIG. 19 shows a view in cross section of the wheel of FIG. 18 in operation and with the tyre cover present.
Figure 21:
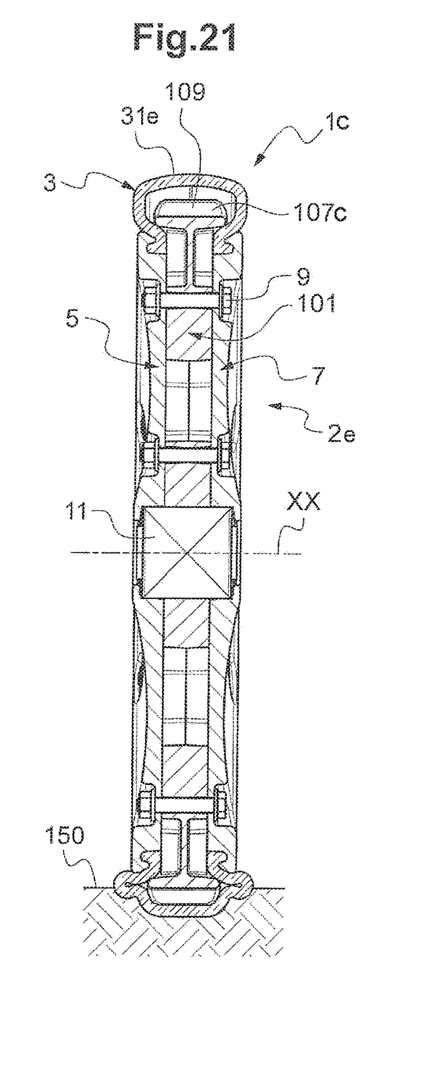
FIG. 21 shows a view in cross section of the wheel of FIG. 20 in operation and with the tyre cover present.
Figure 22:
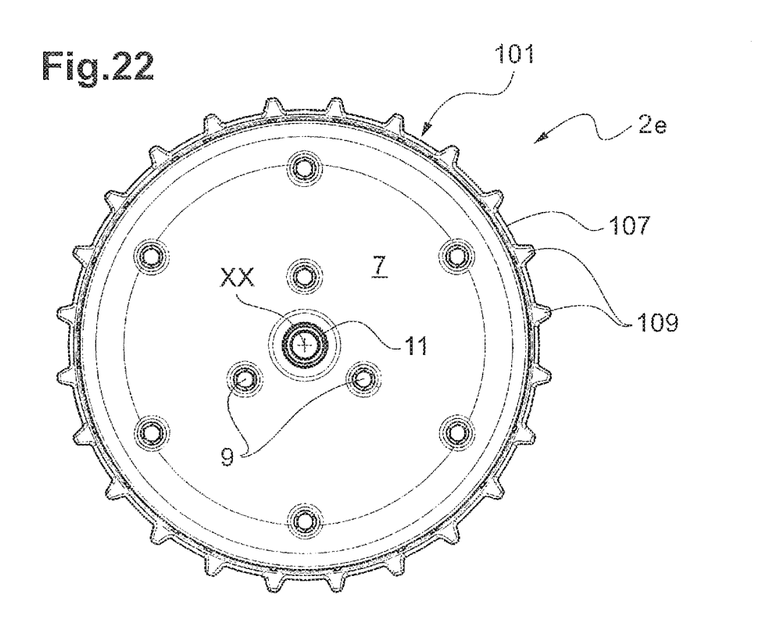
FIG. 22 shows a side view of a wheel similar to those of FIGS. 18 to 21.

The shapes of the tyre covers 3 in FIGS. 9 to 11 can be combined with the spacers 101 of the following figures, as has been depicted, for example, in FIGS. 15, 19 and 21. The adaptability of spacers to the various shapes and of tyre covers of different shapes makes it possible to obtain a high number of combinations. Each wheel 1 thus created may have functions and properties specific to it. These combinations also make it possible to offer wheels 1 in the form of kits of component parts. For example, a pair of flanges may be offered with a set of spacers 101 and a set of tyre covers 3. The user can combine the component parts of the kit at will. The user may thus choose for himself the combination that suits his requirements.

In the embodiment of FIGS. 1 to 11, the active part 107 of the spacer 101 has a double dome shape in cross section. Two similar domes are joined together by a cavity. This shape has an axis of symmetry corresponding to the mid plane perpendicular to the axis of rotation XX of the wheel 1. Such a shape makes it possible simultaneously to create two furrows substantially parallel to one another as the wheel 1 runs along the ground 150.

In the embodiments of FIGS. 12, 13, 18 and 19, the active part 107a, 107c of the spacer 101 has a cross section in the shape of a dome 110 or a point. This shape has an axis of symmetry corresponding to the mid plane perpendicular to the axis of rotation XX of the wheel 1a. Such a shape makes it possible to create one furrow as the wheel 1a runs along the ground 150. The spacer 101 of FIG. 13 has a diameter greater than that of the spacer 101 of FIG. 12, which is itself greater than that of the spacer 101 of FIGS. 18 and 19. The separation between the tread 31c of tyre cover 3c at rest and the active part 107a is slightly greater in FIG. 13 than it is in FIG. 12, and greater in FIG. 12 than it is in FIGS. 18 and 19. That makes it possible to create a furrow that is more or less pronounced, more or less deep according to requirements and according to the hardness of the soil.

Figure 20:
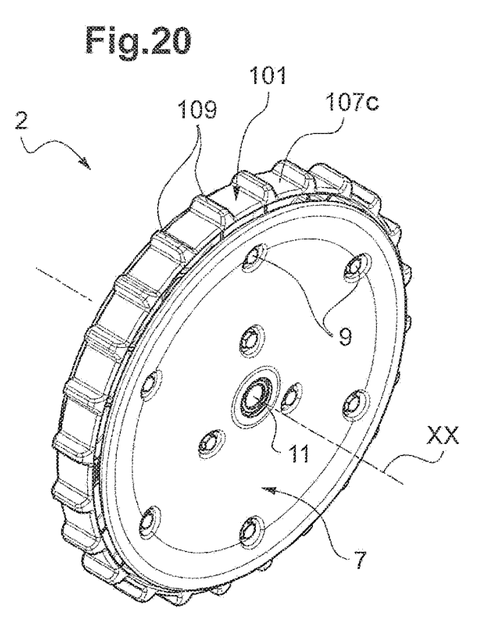
FIG. 20 shows a perspective view of a wheel according to the invention with the tyre cover absent.

In the embodiments of FIGS. 20 and 21, the active part 107c of the spacer 101 has a flattened cross section at its radial end. This shape has an axis of symmetry corresponding to the mid plane perpendicular to the axis of rotation XX of the wheel 1. Such a shape allows the soil to be flattened or compacted over a specific width.

In the embodiments of FIGS. 14 to 17, the active part 107b of the spacer 101 has an asymmetric cross section. In this instance, the shape is reminiscent of that of a bevel or of an asymmetric point. Such a shape can be used for example for closing a furrow. As has been depicted in FIG. 16, by running along beside the furrow, the soil tends to be thrown sideways to close the furrow. A wheel 1b on its own may be enough to close a furrow. As an alternative, two wheels 1b can run one on each side of the furrow to close the furrow. In the alternative form depicted in FIG. 17, two wheels 1b similar to that of FIG. 16 work together. In this instance, the two wheels 1b are symmetric to one another about a vertical plane passing through the furrow that is to be closed. The two wheels 1b are mounted in a V shape. In other words, the wheels 1b are not arranged vertically but on the contrary are oriented partly toward the ground. Their respective axis of rotation XX is substantially inclined with respect to the horizontal. They form for example an angle of between 5° and 15° with the horizontal. The main plane of each of the wheels 1b forms an angle of between 5° and 15° with the vertical. Thus, the combination of the inclination of the wheels 1b and of the shape of the active part 107b allows the furrow to be closed by simultaneously bringing earth in from each side of the furrow.

In alternative forms that can be combined with each of the examples of wheels given here, and particularly those of FIGS. 14 to 17, wheels 1b may be mounted in pairs in a V configuration when viewed from above. The wheels 1b are arranged at a non-zero angle with respect to the direction of forward travel. Their respective axis of rotation XX is not perpendicular to the direction of forward travel. The main planes of the wheels for example make an angle of between 5° and 15° with the direction of forward travel. In that case, one of the side walls of the tyre cover 3d pushes against the soil. Such operation is reminiscent of how a snow plough blade works.

In the embodiments of FIGS. 18 to 25, and unlike in FIGS. 1 to 17, the spacer 101 has an active part 107a, c with a cross section that varies along the circumference of the wheel 1c. In particular, the active shape 107a, c projecting from the flanges 5, 7 is discontinuous along the circumference. In the examples described here, the peripheral surface of the active part 107a, c of the spacer 101 has teeth 109.

In the examples described here, the teeth 109 are distributed more or less equidistant from one another along the circumference. For each embodiment, the teeth 109 of the wheel 1c are identical to one another. As an alternative, the teeth 109 of a spacer 101 could differ from one another, for example being configured as an alternation of at least two different tooth forms.

Figure 23:
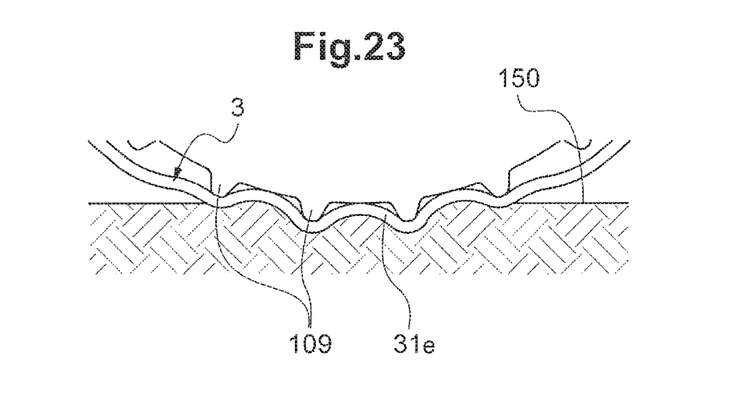
FIG. 23 shows a detailed and side view of a wheel similar to those of FIGS. 18 to 21 in operation.

Such discontinuity makes it possible to create in the ground 150 impressions that vary along the direction of forward travel of the wheel 1c. This effect is depicted in FIG. 23. In the examples described here, the tread 31 of the tyre cover 3 is substantially uniform along the circumference. As a result, the deformation of the tread 31e during running is dependent on the presence of a tooth 109 or of a region devoid of a tooth 109. In operation, the parts of the tread 31 that are situated facing a tooth 109 are trapped by these teeth against the ground 150. The parts of the tread 31 that are situated facing a region that has no tooth 109 are free to deform upon contact with the ground. Such discontinuity also makes it possible to relieve the stresses that may arise in the tread 31. The rubbing and shearing of the tread 31e between the ground 150 and the active part 107 of the spacer 101 are limited. The risk of degradation of the tread 31 is reduced.

In alternative forms, the tyre cover 3 has discontinuities along the circumference, for example studs or voids.

Figure 24:
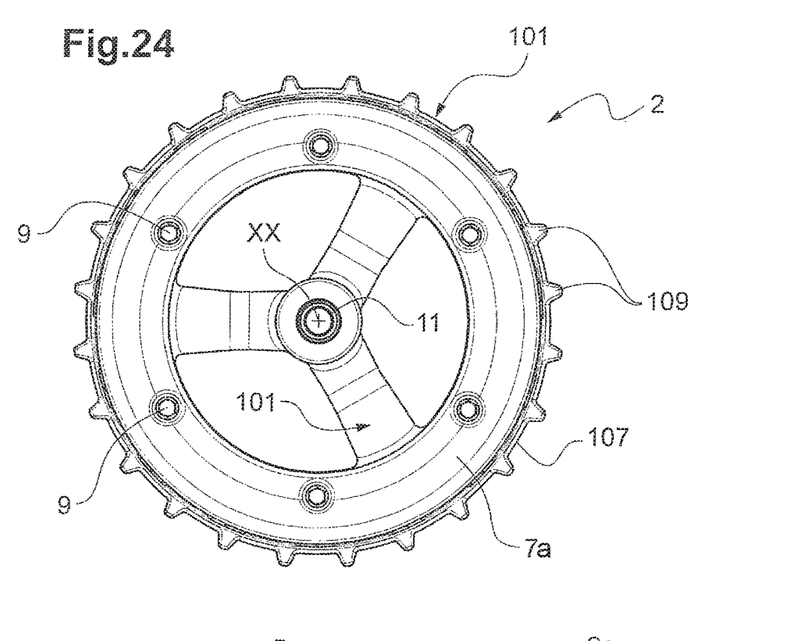
FIG. 24 shows a side view of an alternative form of the wheel of FIG. 20 with the tyre cover absent.
Figure 25:
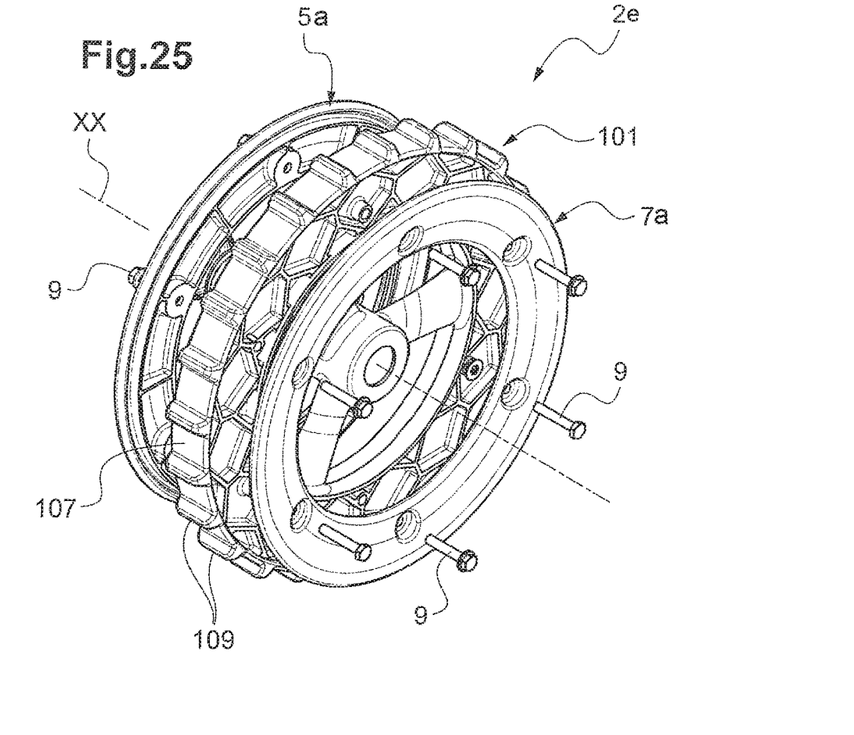
FIG. 25 shows an exploded and perspective view of the wheel of FIG. 24.

In the embodiment of FIGS. 24 and 25, the central part 103 of the spacer 101 is hollowed to a large extent. The central part 103 comprises a hub connected to the intermediate part 105 by branches, in this instance three of them. Furthermore, the flanges 5a, 7a have an annular overall shape, hollowed at their centre, as can be seen in FIG. 25. Here, the hub of the wheel body 2 is formed by the spacer 101 and not by the flanges 5a, 7a. In alternative forms, one or both of the two flanges 5a, 7a have a similar configuration, that is to say with a hub-forming part connected to a peripheral part. Such flanges 5a, 7a can be combined with the spacer 101 of FIGS. 24 and 25 or with a spacer 101 that has no central part 103.

Such hollowed wheel bodies 2 allow the wheel 1 to have a more lightweight structure. Furthermore, the through-openings in the wheel 1 allow air through during operation. Such a wheel body 2, having a hollowed wheel centre is not very sensitive to cross winds during operation. Furthermore, the openings increase the accessibility of nearby implements of the agricultural machine, for example so that maintenance or cleaning can be carried out without the need to remove the wheel 1 from the rest of the machine.

The spacer 101 and the hollowed flanges 5a, 7a of FIGS. 24 and 25 may be combined with spacers 101 with active parts 107 of varying shape or even that have no active part 107.

The invention is not confined to the examples of wheels described hereinabove solely by way of example but encompasses any alternative form that a person skilled in the art may consider within the scope of the claims that follow.

The invention claimed is:

1. A wheel assembly for working in fields, comprising:
   a wheel body comprising a pair of flanges;
   a spacer at least partially mounted between the pair of flanges of the wheel body, the spacer and the pair of flanges are connected to each other by one or more fixing devices; and
   a tire cover comprising two side walls and a tread connecting the side walls to one another, the tire cover including an opening opposite to the tread,
   wherein the tire cover includes a first and a second lip respectively formed at free end portions of the side walls, the first and second lips project from the side walls in a direction towards an outside of the tire cover,
   wherein a portion of the spacer is positioned within the opening,
   wherein each of the pair of flanges includes a cavity in the form of a groove along a periphery of the flange, and
   wherein each of the first and second lips are configured to project into a respective cavity of the pair of flanges so that the pair of flanges block the side walls of the tire cover against the spacer at least near the opening.

2. The wheel assembly according to claim 1, in which at least one of the side walls of the tire cover comprises a lip near the opening and at least one of the pair of flanges and of the spacer comprises a cavity shaped to collaborate in pairs with the lip to lock the tire cover on the wheel body.

3. The wheel assembly according to claim 1, in which the spacer comprises an active part arranged, when not loaded, near the tread and radially inward of the tread, whereas the tire cover and the active part are arranged relative to one another so that, under load, the tread collapses and hugs a shape of the active part, the tread then forming impressions in ground that correspond substantially to the shape of the active part.

4. The wheel assembly according to claim 3, in which the active part in cross section has one of the following shapes:
   a dome having an axis of symmetry perpendicular to an axis of rotation of the wheel, and
   two domes joined together by a cavity and having an axis of symmetry perpendicular to an axis of rotation of the wheel.

5. The wheel assembly according to claim 3, in which the active part has a cross section of asymmetric shape.

6. The wheel assembly according to claim 3, in which the spacer is annular in shape and the active part has a cross section that varies along a circumference of the spacer.

7. The wheel assembly according to claim 1, in which the side walls and the tread have substantially a same thickness.

8. A kit intended to form a wheel assembly comprising:
   a pair of flanges;
   at least one spacer at least partially mounted between the pair of flanges, the spacer and the pair of flanges are connected to each other by one or more fixing devices; and
   a generally annular tire cover comprising two side walls and a tread connecting the side walls to one another, the tire cover further comprising an opening opposite to the tread, wherein the tire cover includes a first and a second lip respectively formed at free end portions of the side walls, the first and second lips project from the side walls in a direction towards an outside of the tire cover, wherein the at least one spacer is positioned within the opening, wherein each of the pair of flanges includes a cavity in the form of a groove along a periphery of the flange, wherein each of the first and second lips are configured to project into a respective cavity of the pair of flanges, and wherein the flanges are to be assembled with the spacer to form a wheel body while blocking the side walls of the tire cover against the spacer at least near the opening.

* * * * *